United States Patent
Shaw

(10) Patent No.: US 11,202,255 B1
(45) Date of Patent: Dec. 14, 2021

(54) CACHED ENTITY PROFILES AT NETWORK ACCESS NODES TO RE-AUTHENTICATE NETWORK ENTITIES

(71) Applicant: T-Mobile USA, Inc., Bellevue, WA (US)

(72) Inventor: Venson Shaw, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/945,592

(22) Filed: Jul. 31, 2020

(51) Int. Cl.
| | |
|---|---|
| *H04W 4/00* | (2018.01) |
| *H04W 48/18* | (2009.01) |
| *H04W 76/10* | (2018.01) |
| *H04W 24/02* | (2009.01) |
| *H04W 88/04* | (2009.01) |
| *H04W 84/12* | (2009.01) |
| *H04W 8/18* | (2009.01) |

(52) U.S. Cl.
CPC ............ *H04W 48/18* (2013.01); *H04W 8/18* (2013.01); *H04W 24/02* (2013.01); *H04W 76/10* (2018.02); *H04W 84/12* (2013.01); *H04W 88/04* (2013.01)

(58) Field of Classification Search
CPC ..... H04W 48/18; H04W 48/20; H04W 76/10; H04W 8/18; H04W 8/183; H04W 8/186; H04W 8/20; H04W 8/205; H04W 24/02; H04W 24/04; H04W 84/12; H04W 88/04; H04W 88/06; H04W 88/08; H04W 88/085; H04W 88/10; H04W 88/12; H04W 88/18
USPC ...................................................... 370/329
See application file for complete search history.

(56) References Cited

U.S. PATENT DOCUMENTS

| | | | |
|---|---|---|---|
| 8,126,467 | B2 | 2/2012 | Choi et al. |
| 8,126,496 | B2 | 2/2012 | Brisebois et al. |
| 8,165,592 | B2 | 4/2012 | Soliman et al. |
| 8,494,531 | B2 | 7/2013 | Soliman et al. |
| 8,693,953 | B2 | 4/2014 | Aguirre et al. |
| 8,918,096 | B2 | 12/2014 | Drazynski et al. |
| 9,094,437 | B2 | 7/2015 | Pancorbo Marcos et al. |
| 9,237,477 | B2 | 1/2016 | Drazynski et al. |
| 9,386,116 | B2 | 7/2016 | Li et al. |
| 9,392,000 | B2 | 7/2016 | Shaikh |
| 9,544,835 | B2 | 1/2017 | Yilmaz et al. |

(Continued)

FOREIGN PATENT DOCUMENTS

KR   20180030176 A   3/2018

OTHER PUBLICATIONS

International Searching Authority, International Search Report and Written Opinion, PCT Patent Application PCT/US2021/040719, dated Oct. 27, 2021, 15 pages.

*Primary Examiner* — Huy C Ho
(74) *Attorney, Agent, or Firm* — Perkins Coie LLP

(57) ABSTRACT

A method performed by a network access node (NAN) can re-authenticate a network entity for a telecommunications network with a locally cached profile. The NAN can receive a connection request of a wireless device to access the network, receive an indication that the network entity has been authenticated by the unified data management (UDM) to provide access to the network, fetch entity profile data from the UDM, and cache the entity profile data locally, along with an indication of a time period during which the cached profile data is available for re-authenticating the network entity without needing to re-fetch the entity profile data or check with the UDM.

20 Claims, 6 Drawing Sheets

(56) References Cited

U.S. PATENT DOCUMENTS

| | | |
|---|---|---|
| 9,661,601 B2 | 5/2017 | Fischer et al. |
| 9,717,112 B2 | 7/2017 | Cai et al. |
| 9,736,712 B2 | 8/2017 | Yilmaz et al. |
| 9,832,719 B2 | 11/2017 | Horn et al. |
| 9,843,687 B2 | 12/2017 | Campbell et al. |
| 10,034,165 B2 | 7/2018 | Betti et al. |
| 10,231,257 B2 | 3/2019 | Huang et al. |
| 10,306,461 B2 | 5/2019 | Nenner et al. |
| 10,306,533 B2 | 5/2019 | Cheng et al. |
| 10,349,313 B2 | 7/2019 | Chen et al. |
| 10,382,945 B2 | 8/2019 | Skög et al. |
| 10,397,840 B2 | 8/2019 | Shaw et al. |
| 10,470,118 B2 | 11/2019 | Horn et al. |
| 10,555,165 B2 | 2/2020 | Shekhar et al. |
| 2004/0146019 A1 | 7/2004 | Kim et al. |
| 2005/0021740 A1 | 1/2005 | Bar et al. |
| 2006/0168643 A1 | 7/2006 | Howard et al. |
| 2006/0217121 A1 | 9/2006 | Soliman et al. |
| 2007/0142053 A1 | 6/2007 | Soliman et al. |
| 2007/0208936 A1 | 9/2007 | Ramos |
| 2007/0249352 A1 | 10/2007 | Song et al. |
| 2009/0054037 A1 | 2/2009 | Kaippallimalil |
| 2011/0093790 A1* | 4/2011 | Maczuba ............ G06F 16/9574 715/745 |
| 2011/0128907 A1 | 6/2011 | Kvernvik |
| 2011/0173678 A1 | 7/2011 | Kaippallimalil et al. |
| 2011/0283011 A1 | 11/2011 | Li et al. |
| 2013/0017820 A1 | 1/2013 | Drazynski et al. |
| 2013/0074149 A1 | 3/2013 | Shaikh |
| 2013/0183983 A1 | 7/2013 | Awad et al. |
| 2014/0092865 A1 | 4/2014 | Heo et al. |
| 2014/0126527 A1 | 5/2014 | Xiong et al. |
| 2014/0146732 A1 | 5/2014 | Olufunmilola et al. |
| 2014/0171097 A1 | 6/2014 | Fischer et al. |
| 2014/0242989 A1 | 8/2014 | Cai et al. |
| 2015/0004971 A1 | 1/2015 | Yilmaz et al. |
| 2015/0043437 A1 | 2/2015 | Chakraborty et al. |
| 2015/0079972 A1 | 3/2015 | Drazynski et al. |
| 2015/0117207 A1 | 4/2015 | Radulescu et al. |
| 2015/0195759 A1 | 7/2015 | Sirotkin et al. |
| 2015/0215777 A1 | 7/2015 | Sirotkin et al. |
| 2015/0271848 A1 | 9/2015 | Gerasimenko et al. |
| 2016/0112943 A1 | 4/2016 | Horn et al. |
| 2016/0150467 A1 | 5/2016 | Shaw et al. |
| 2016/0174088 A1 | 6/2016 | Yilmaz et al. |
| 2016/0255631 A1 | 9/2016 | Cui et al. |
| 2016/0262063 A1 | 9/2016 | Chen et al. |
| 2017/0006627 A1 | 1/2017 | Huang et al. |
| 2017/0064029 A1* | 3/2017 | Das ..................... H04W 4/18 |
| 2017/0094499 A1 | 3/2017 | Nenner et al. |
| 2017/0142571 A1 | 5/2017 | Skög et al. |
| 2017/0164185 A1 | 6/2017 | Betti et al. |
| 2018/0084490 A1 | 3/2018 | Horn et al. |
| 2018/0242224 A1 | 8/2018 | Pinheiro et al. |
| 2019/0036908 A1 | 1/2019 | Liu et al. |
| 2019/0053157 A1 | 2/2019 | Lin et al. |
| 2020/0015065 A1* | 1/2020 | Dowlatkhah ........... H04W 8/18 |

* cited by examiner

CACHED ENTITY PROFILES AT NETWORK ACCESS NODES TO RE-AUTHENTICATE NETWORK ENTITIES

BACKGROUND

Major telecommunications providers are set to make heavy use of network access nodes such as small cells (e.g., picocell, femtocell, microcell) to rollout expansive fifth generation (5G) coverage. In short, small cells make use of low-power, short-range wireless transmission systems that cover small geographical areas or small proximity indoor and outdoor spaces. Small cells have many of the same characteristics of the classic base stations that have been used by telecommunications companies for years. However, they are uniquely capable of handling high data rates for mobile broadband and consumers, for Internet-of-Things (IoT), high densities of low-speed, and low-power devices. This feature makes small cell devices perfect for the 5G rollout that promises ultra-high speeds, a million devices per square mile and latencies in the millisecond range.

Most small cell communications and devices are harmless to 5G networks. However, a small fraction of the communications pose serious security risks to 5G networks. In particular, small cells are typically used to extend coverage or add network capacity in areas with very dense phone usage, such as train stations, shopping malls, urban parks or stadiums. Small cells provide coverage and capacity in areas difficult or expensive to reach using the more traditional macro-cell approach. However, a network of small cells is readily accessible for hacking and thus creates more points of attack that increases the vulnerability of 5G networks. Thus, although most interconnected devices on networks are safe, dependable, and reliable, 5G wireless networks create a greater number of vulnerabilities compared to other communication networks. The vulnerabilities of small cell devices cannot be addressed with conventional network hardening techniques because deployment across a numerous distributed base stations is cost-prohibitive, resource intensive, and thus impractical.

BRIEF DESCRIPTION OF THE DRAWINGS

Embodiments of the present technology will be described and explained through the use of the accompanying drawings.

Figure 1:
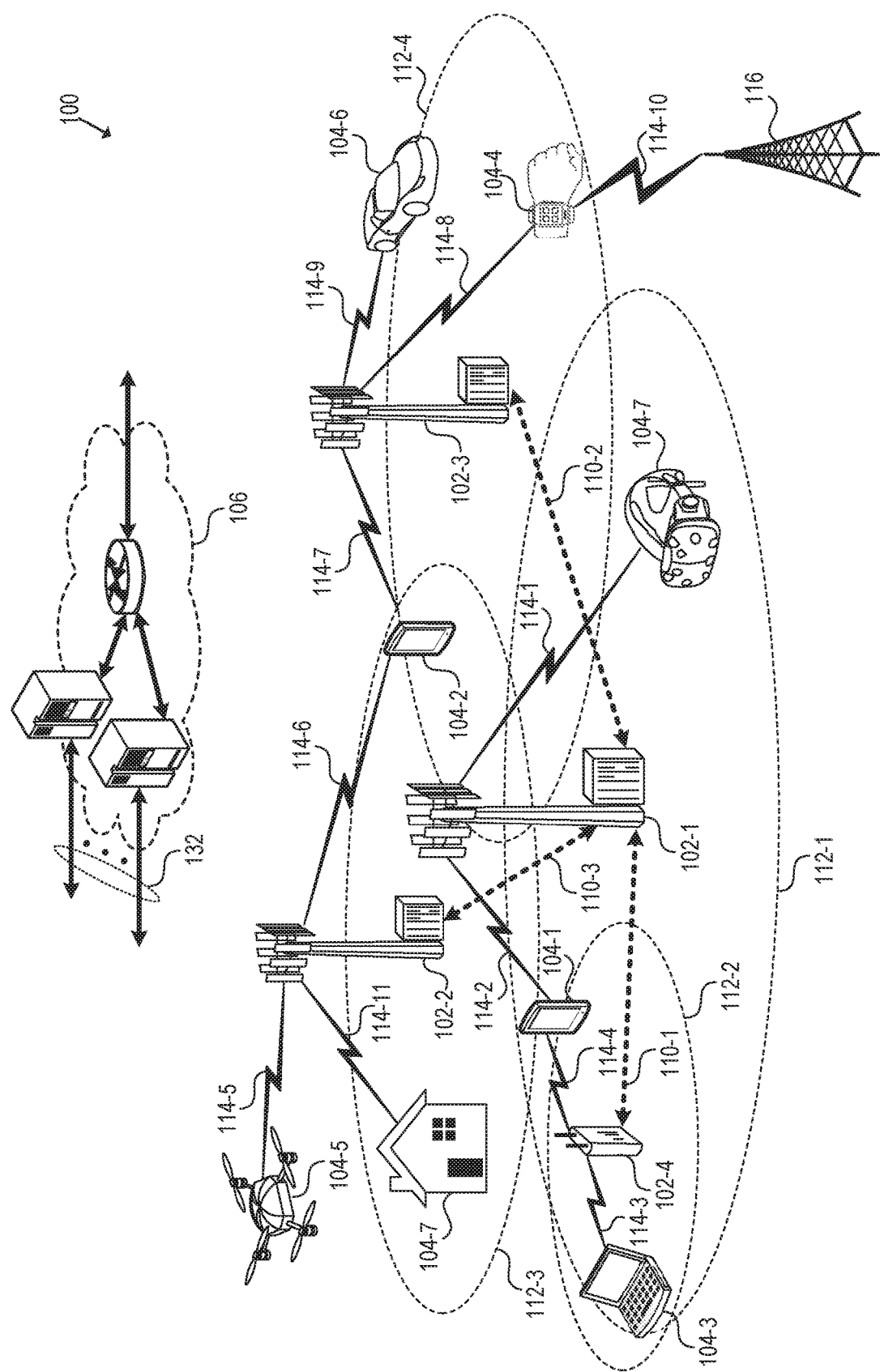
FIG. 1 is a block diagram that illustrates a wireless communications system.

Various features of the technologies described herein will become more apparent to those skilled in the art from a study of the Detailed Description in conjunction with the drawings. Embodiments are illustrated by way of example and not limitation in the drawings, in which like references may indicate similar elements. While the drawings depict various embodiments for the purpose of illustration, those skilled in the art will recognize that alternative embodiments may be employed without departing from the principles of the technologies. Accordingly, while specific embodiments are shown in the drawings, the technology is amenable to various modifications.

DETAILED DESCRIPTION

The disclosed technology relates to security solutions implemented at network access nodes (NANs) such as small cells of telecommunications networks. Generally, a small cell works like a conventional cell with advanced techniques such as Multiple-Input and Multiple-Output (MIMO), beamforming and millimeter wave bands (mmW) for transmission. Low power transmitting stations can be easily deployed using the small cell concept. Moreover, small cell hardware units are designed to reduce complexity, and thus, implementation is faster and easier. These small base stations (or transceivers) are wall mountable for indoor applications, and many of the small towers or lamp posts are outdoors. The backhaul connections are made with fiber, wired and microwave connections, which makes configuration less complicated than previous forms.

An aspect of this technology includes an improved authorization mechanism. In existing systems, a network entity (e.g., subscriber, wireless device) needs to get authorized by a core node (e.g., unified data management (UDM)) every time a wireless device seeks to access a 5G network. This is burdensome because 5G networks could be sparsely accessible and numerous small cells (e.g. picocells, femtocells, microcells) can potentially send a flood of authorization requests to the UDM for wireless devices that hop on/off 5G networks. The disclosed technology overcomes these drawbacks by caching device or subscriber profile data, obtained from the UDM, at local NANs (e.g., small cells) for limited time periods. As such, the local NAN can re-authorize a UE hopping on/off 5G networks without needing to check with the UDM. This improves connectivity by reducing latency and avoids authorization bottlenecks at the UDM. The cached profiles are stored for a fixed time period or a variable time period that can depend on the network load (e.g., shorter time period during times of greater load), or based on network security threat levels (e.g., shorter time period during times of increased network security threat levels). In some examples, the authorization can also be user-specific or content-specific.

Another aspect of the technology relates to detecting and deauthorizing malicious small cells. In particular, a telecommunications network can detect a malicious small cell and then deauthorize it, in some cases doing so wirelessly. In one implementation, the network maintains a schedule for sending status update requests to small cells and receiving counterpart responses at scheduled times. The schedule is only known to an upstream network node and the request/response schedule is different for each small cell. As such, only the upstream network node knows when to expect a response to a particular request. Accordingly, the network can detect when a hacker interrupts a status update process. The upstream network node can then deauthorize and disable the small cell over-the-air (OTA). That is, the network can deauthorize and disable the small cell wirelessly. Specifically, an upstream network node can maintain a database directory that can be marked for deauthorization for monitoring before disabling the small cell. In other words, the deauthorizing refers to putting the small cell in a deauthorization state for monitoring, then after monitoring for a time period for suspicious behavior, the upstream network node can decide to deregister or disable the small cell or restore the small cell.

The described technology can thus safeguard a wireless network infrastructure including numerous small cells. Additional techniques are described in the assignee's related applications including U.S. patent application Ser. No. 16/945,570, filed Jul. 31, 2020, titled "Detecting Malicious Small Cells Based on a Connectivity Schedule," U.S. patent application Ser. No. 16/849,158, filed Apr. 15, 2020, titled "On-Demand Security Layer for a 5G Wireless Network," and U.S. patent application Ser. No. 16/921,765, filed Jul. 6, 2020, titled "Security System for Managing 5G Network Traffic," each of which are incorporated by reference in their entireties for all purposes.

Wireless Communications System

FIG. 1 is a block diagram that illustrates a wireless communication system 100 ("system 100") in which aspects of the disclosed technology are incorporated. The system 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The system 100 can include any combination of NANs including an access point, a radio transceiver, a gNodeB (gNB), NodeB, eNodeB (eNB), Home NodeB, a Home eNodeB, or the like. In addition to being a WWAN base station, a NAN can be a WLAN access point, such as an IEEE 802.11 access point.

The NANs of a network formed by the system 100 also includes wireless devices 104-1 through 104-8 (referred to individually as "wireless device 104" or collectively as "wireless devices 104") and a core network 106. The wireless devices 104-1 through 104-8 are capable of communication using various connectivity standards. For example, a 5G communication channel can use millimeter waver (mmW) access frequencies of 28 GHz or more. In some implementations, the wireless device 104 can operatively couple to a base station 102 over an LTE/LTE-A communication channel, which is referred to as a 4G communication channel.

The core network 106 can provide, manage, or control security services, user authentication, access authorization, tracking, Internet Protocol (IP) connectivity, and other access, routing, or mobility functions. The base stations 102 interface with the core network 106 through a first set of backhaul links 108 (e.g., S1 interfaces) and can perform radio configuration and scheduling for communication with the wireless devices 104 or can operate under the control of a base station controller (not shown). In some examples, the base stations 102 can communicate, either directly or indirectly (e.g., through the core network 106), with each other over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The system 100 can include base stations of different types (e.g., macro and/or small cell base stations). In some implementations, there can be overlapping geographic coverage areas 112 for different service environments (e.g., Internet-of-Things (IOT), mobile broadband (MBB), vehicle-to-everything (V2X), machine-to-machine (M2M), machine-to-everything (M2X), ultra-reliable low-latency communication (URLLC), machine-type communication (MTC)).

In some examples, the system 100 can include a 5G network and/or an LTE/LTE-A network. In an LTE/LTE-A network, the term eNB is used to describe the base stations 102 and, in 5G or new radio (NR) networks, the term gNBs is used to describe the base stations 102 that include mmW communications. The system 100 can form a heterogeneous network in which different types of base stations provide coverage for various geographical regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow unrestricted access by wireless devices with service subscriptions with the network provider. As indicated earlier, a small cell is a lower-powered base station, as compared with a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices with service subscriptions with the network provider. A femto cell covers a relatively small geographic area (e.g., a home) and can provide restricted access by wireless devices having an association with the femto cell (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network are NANs, including small cells. The table below shows relative characteristics of small cells.

| Types of Small Cell | Coverage Radius | Indoor or Outdoor | Transmit Power | Number of Users | Backhaul Type | Cost |
|---|---|---|---|---|---|---|
| Femto cells | 30-165 ft 10-50 m | Indoor | 100 mW | 8-16 | Wired, fiber | Low |
| Pico cells | 330-820 ft 100-250 m | Indoor Outdoor | 20 dBm 24 dBm | 32-64 | Wired, fiber | Low |
| Micro cells | 1600-8000 ft 500-2500 | Outdoor | 2000-5000 mW 33-37 dBm | 200 | Wired, Fiber, Microwave | Medium |

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

As illustrated, the wireless devices 104 are distributed throughout the system 100, where each wireless device 104 can be stationary or mobile. A wireless device can be referred to as a mobile station, a subscriber station, a mobile unit, a subscriber unit, a wireless unit, a remote unit, a handheld mobile device, a remote device, a mobile subscriber station, an access terminal, a mobile terminal, a wireless terminal, a remote terminal, a handset, a mobile client, a client, or the like. Examples of a wireless device include user equipment (UE) such as a mobile phone, a personal digital assistant (PDA), a wireless modem, a handheld mobile device (e.g., wireless devices 104-1 and 104-2), a tablet computer, a laptop computer (e.g., wireless device 104-3), a wearable (e.g., wireless device 104-4). A wireless device can be included in another device such as, for example, a drone (e.g., wireless device 104-5), a vehicle (e.g., wireless device 104-6), an augmented reality/virtual reality (AR/VR) device such as a head-mounted display device (e.g., wireless device 104-7), an IoT device such as an appliance in a home (e.g., wireless device 104-8), or a wirelessly connected sensor that provides data to a remote server over a network.

A wireless device can communicate with various types of base stations and network equipment at the edge of a network including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-11 (also referred to individually as "communication link 114" or collectively as "communication links 114") shown in system 100 include uplink (UL) transmissions from a wireless device 104 to a base station 102, and/or downlink (DL) transmissions, from a base station 102 to a wireless device 104. The downlink transmissions may also be called forward link transmissions while the uplink transmissions may also be called reverse link transmissions. Each communication link 114 includes one or more carriers, where each carrier can be a signal composed of multiple sub-carriers (e.g., waveform signals of different frequencies) modulated according to the various radio technologies described above. Each modulated signal can be sent on a different sub-carrier and carry control information (e.g., reference signals, control channels), overhead information, user data, etc. The communication links 114 can transmit bidirectional communications using FDD (e.g., using paired spectrum resources) or TDD operation (e.g., using unpaired spectrum resources). In some embodiments, the communication links 114 include LTE and/or mmW communication links.

In some embodiments of the system 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that may take advantage of multi-path environments to transmit multiple spatial layers carrying the same or different coded data.

In some embodiments, the wireless devices 104 are capable of communicating signals via the LTE network and an mmW system (e.g., as part of a 5G/NR system). Accordingly, the wireless device 104 can communicate with the base station 102 over an LTE link and/or with a transmission point (TP) or base station (BS) over an mmW link. In another example, at least one of the base stations 102 communicates signals via the LTE network and the mmW system over one or more communication links 114. As such, a base station 116 may be referred to as an LTE+mmW eNB or gNB or as an LTE+mmW TP/BS/mmW-BS.

Figure 2:
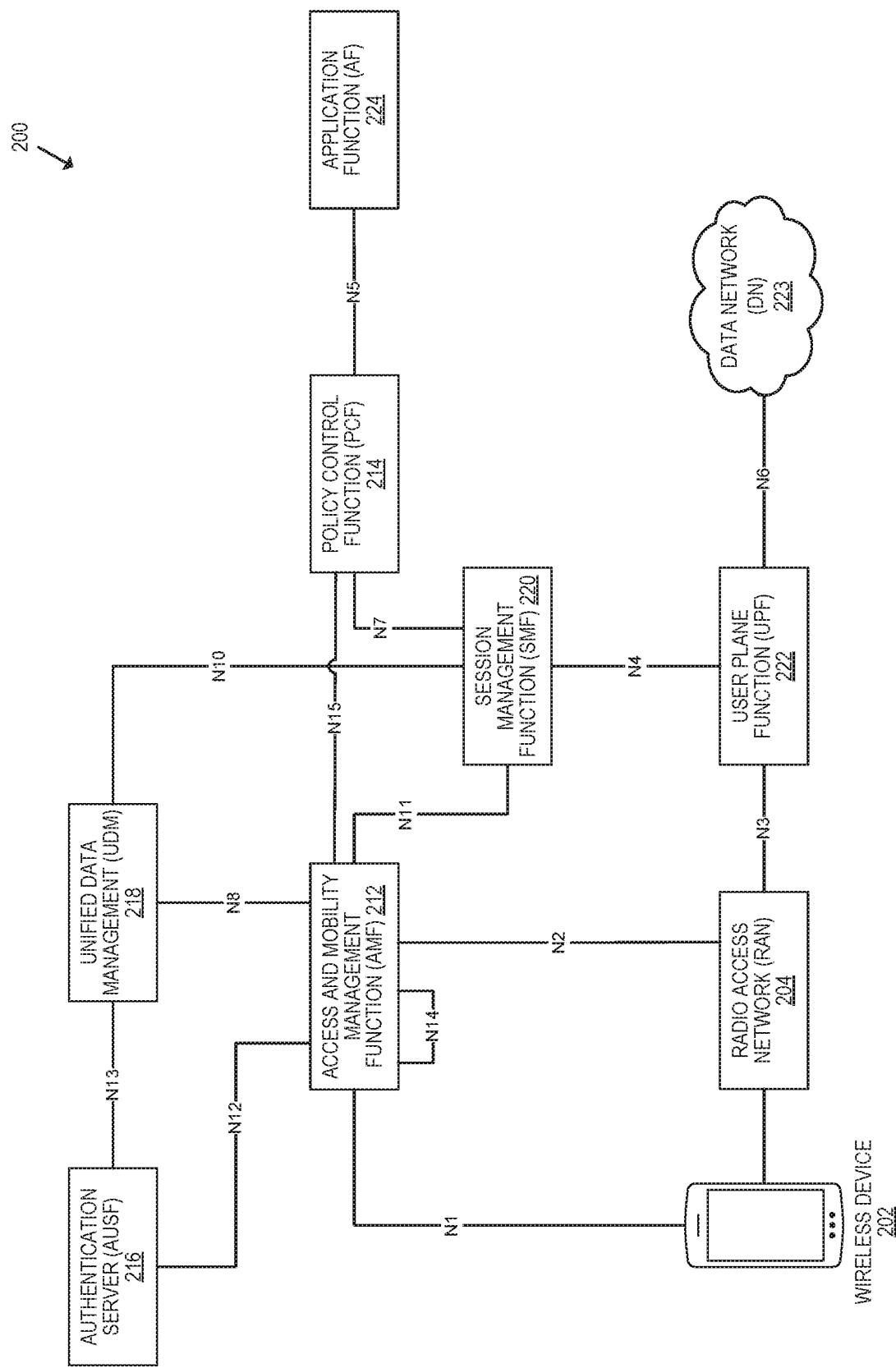
FIG. 2 is a block diagram that illustrates an architecture of network functions of a 5G network.

FIG. 2 is a block diagram that illustrates an architecture of network functions of a 5G network that can implement aspects of the present technology. A wireless device 202 can access the 5G network via a RAN 204, through a NAN such as a small cell. The architecture of the network functions 200 includes an authentication server function (AUSF) 216, a unified data management (UDM) 218, an access and mobility management function (AMF) 212, a policy control function (PCF) 214, a session management function (SMF) 220, and a user plane function (UPF) 222. The PCF 214 can connect with one or more application functions (AFs) 224. The UPF 222 can connect with one or more data networks (DNs) 223. The interfaces N1 through N15 define the communications and/or protocols between each function or component, as described in relevant standards. The UPF 222 is part of the user plane and the AMF 212, SMF 220, PCF 214, AUSF 216, and UDM 218 are part of the control plane. The UPFs can be deployed separately from control plane functions and the network functions of the control plane are modularized such that they can be scaled independently.

A UDM introduces the concept of user data convergence (UDC) that separates the user data repository (UDR) for storing and managing subscriber information from the frontend that processes the subscriber information. The UDM can employ UDC under 3GPP TS 22.101, which supports a layered architecture that separates user data from application logic in 3GPP systems. The UDM 220 is associated with a database (not shown) that can contain profile data for subscribers and/or other data that can be used to authenticate network entities (e.g., subscribers, wireless devices). Given the large number of wireless devices (e.g., IoT devices) that can connect to the 5G network, the UDM 220 contains a voluminous amounts of profile data that is accessed to authenticate network entities.

For example, each time that a wireless device seeks to connect to a 5G network, a UDM receives an indication of a connection request received by a NAN, and authorizes the connection request by authenticating the wireless device or subscriber based on profile data stored at the UDM. The UDM can then communicate an indication of the authorization to the NAN so that the wireless device can access the 5G network through the NAN. This leads to high latency of control signaling, along with voluminous queries across the network from various NANs for the UDM.

Temporarily Cached Profiles to Re-Authenticate Network Entities

The disclosed technology overcomes the aforementioned drawbacks related to authenticating a network entity (e.g., wireless device, subscriber) to authorize access to a 5G network based on profile data stored at a core node. In one implementation, a NAN includes a local component that can cache profile data obtained from a core node, which enables the NAN to authenticate a network entity locally, thereby obviating the need for the core node to authenticate the network entity.

Figure 3:
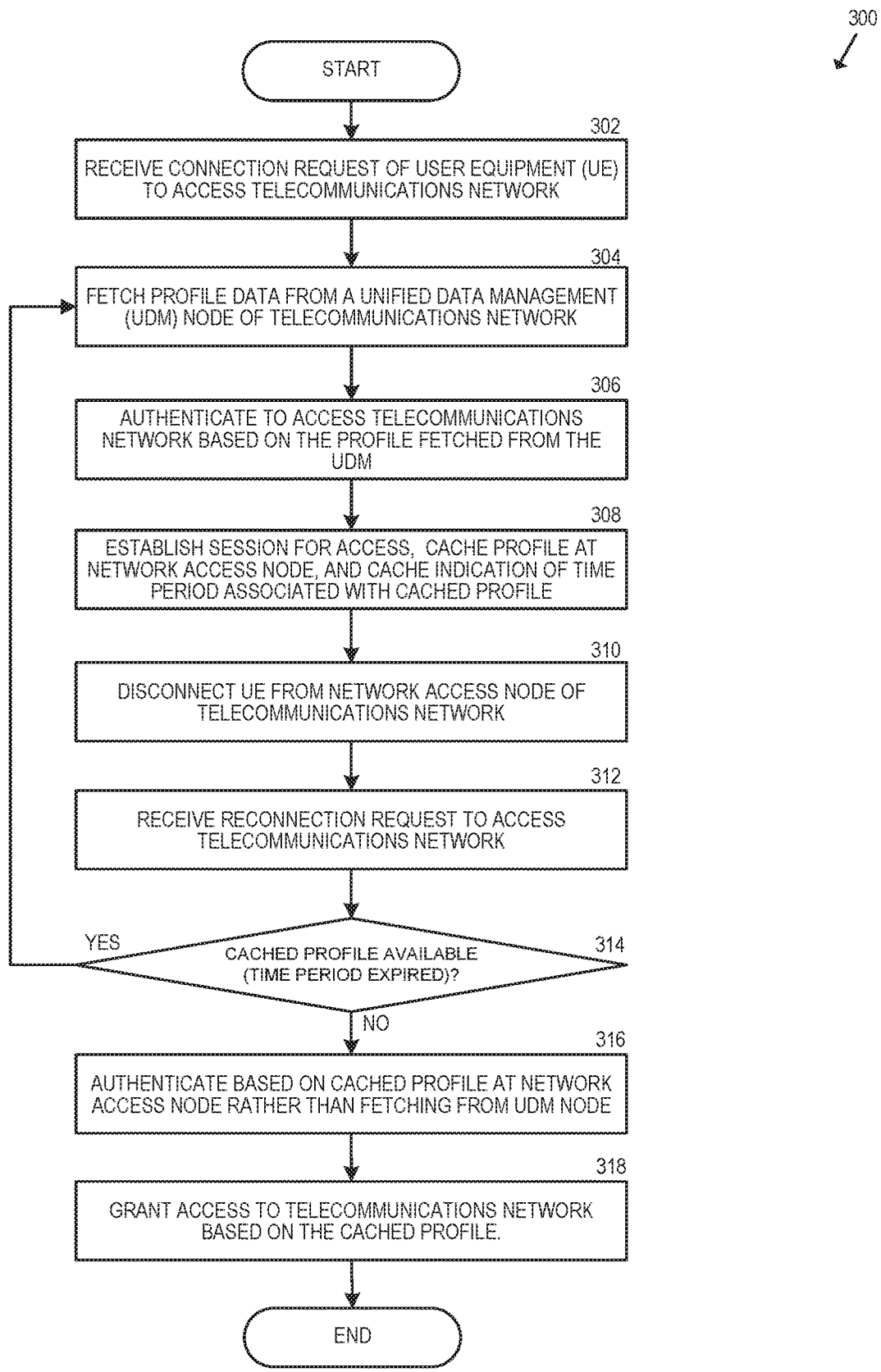
FIG. 3 is a flowchart that illustrates a method for re-authenticating a network entity at a network access device with a temporarily cached profile.

FIG. 3 is a flowchart that illustrates a method 300 for re-authenticating a network entity at a NAN with temporarily cached profile data. The method can be performed by the NAN, which can re-authenticate a connection to a telecommunications network ("network") locally. Examples include a gNB or small cell of a 5G network. In one example, numerous small cells (e.g., picocells, femtocells, microcells) each perform the method 300 to reduce communications with an upstream core node (e.g., UDM) that is otherwise required to authenticate network entities to access the network.

Figure 4:
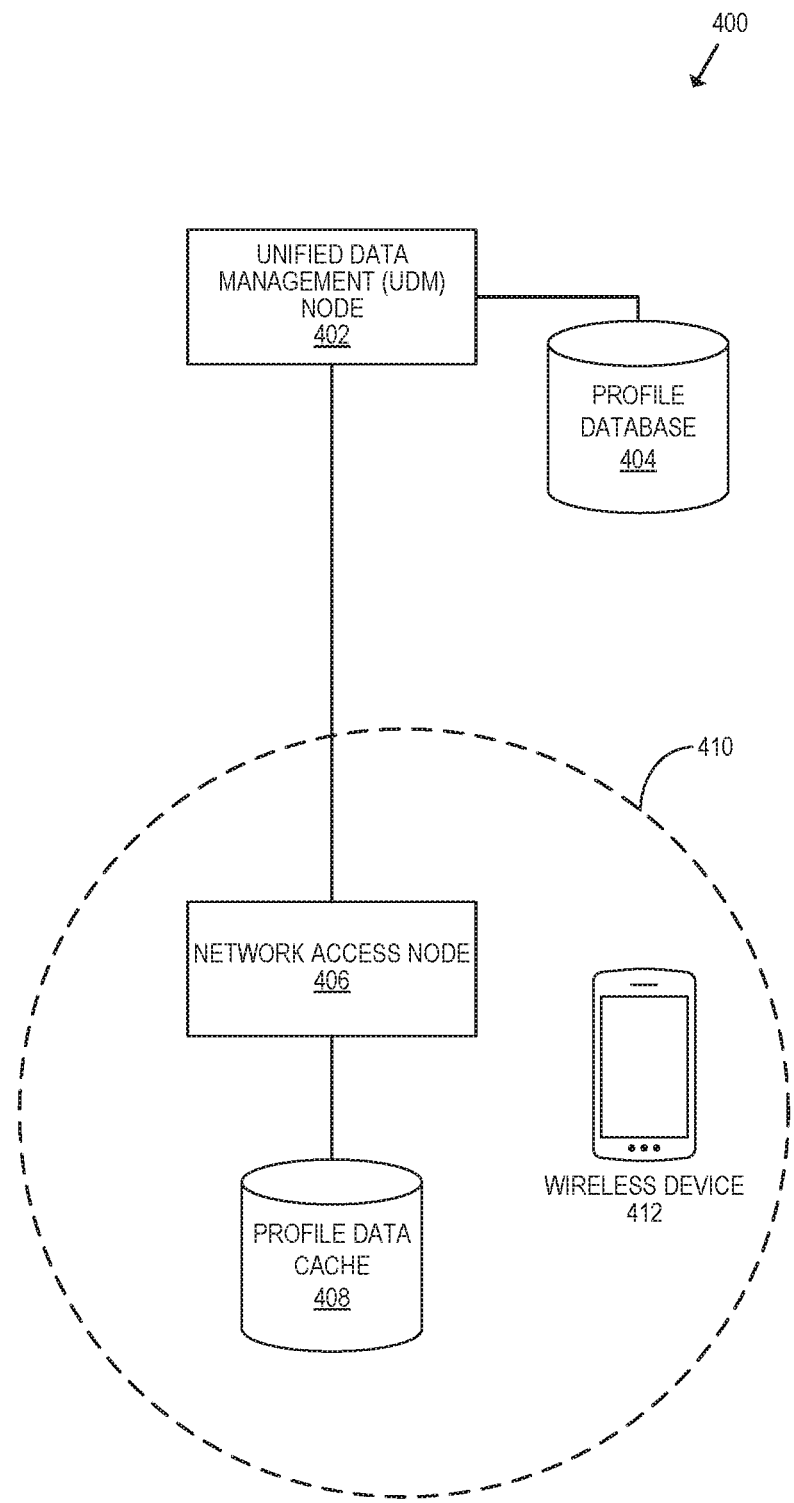
FIG. 4 is a block diagram that illustrates a system that includes a unified data management (UDM) coupled to a network access node.

For example, FIG. 4 is a block diagram that illustrates a system 400 including a UDM 402 coupled to a NAN 406. The NAN 406 has a wireless range that spans an area 410, which includes a wireless device 412. The UDM 402 can access or include a profile database 404 that stores entity profile data such as subscriber or device profile data. In some instances, data other than entity profile data is stored at the profile database 404. A NAN 406 can store entity profile data obtained from the UDM 402 at the entity profile data cache 408. The NAN 406 can obtain profile data of the wireless device 412 from the UDM 402 and cache that profile data at the profile data cache 408. Thus, the NAN 406 can use the cached profile data to authenticate the wireless device 412 without the UDM 402.

Referring back to FIG. 3, at 302, the NAN can receive a connection request of the wireless device to access the network. The connection request includes an indication of a network entity. For example, the connection request can include an IP address of the wireless device or mobile number associated with the subscriber of the network carrier.

At 304, the NAN can fetch entity profile data from an upstream node such as a UDM (e.g., UDM 402) of the network. Examples of the entity profile include a subscriber profile stored at the UDM or a device profile of the wireless device. As such, the entity profile includes information for authenticating the wireless device or the subscriber to thereby enable access by the wireless device to the network.

At 306, the NAN can receive a notification that the network entity has been authenticated by the UDM or the NAN itself can authenticate the network entity to access the network based on the entity profile data obtained from the UDM. For example, the NAN can compare profile data to data included in the connection request. Hence, a local authentication procedure can be conducted in a manner analogous to a conventional authentication procedure performed with at an upstream UDM.

At 308, in response to the authentication, the NAN can establish a session for the wireless device to access the network and cache an indication of a timer or time period (e.g., timer function) in association with a cached profile data. The cached profile data expires upon completion of the time period. For example, a small cell can store a subscriber profile for an hour or a day so that the subscriber profile is available locally if the subscriber seeks to reconnect with the network during that time. As such, the subscriber can gain access quickly and the UDM is less burdened with connection requests.

In an implementation, the NAN can generate a cached profile based on (or derived from) profile data obtained from the upstream node. In other words, the NAN can create the cached profile without needing to obtain the entire profile from the upstream node. In another implementation, the cached profile is generated based on the outcome of an authentication process of the upstream node. For example, the NAN can receive an authentication notification from the upstream node. The outcome of the authentication (e.g., grant, deny) can be mapped to data included in a connection request (e.g., device or subscriber identifier) to create the cached profile. As such, the NAN does not need to receive any profile data to generate a cached profile that could enable subsequent authentication of a network entity at the NAN without needing to send the connection request to an upstream node.

The time period can be fixed, based on a subscription of the subscriber associated with wireless device. In another implementation, the time period is variable and depends on a condition of the network or the NAN (e.g., traffic load or time of day). For example, a network node can determine the network load such that, when the network load on the network is above a threshold amount, the time period can be set to a particular amount. When the network load is below the threshold amount, the time period can be set to a different amount. For example, the time period can be set to a shorter period when the load on the network or a small cell is high and then reset to a longer period when the load on the network or the small cell returns to normal.

The time period can be determined at the NAN and depend on a pattern of connectivity of the wireless device with the small cell. For example, the NAN can set a longer time period for a wireless device or subscriber that connects to the network more frequently at the particular NAN compared to other wireless devices or subscribers that connect less frequently at the particular NAN.

The time period can be determined programmatically or algorithmically based on data values associated with a network entity seeking access to the network. For example, a device or subscriber can be associated with a risk levels such as high, medium, or low risk levels. Any device associated with a high risk level can be set to time periods that are shorter than devices associated with a medium risk level, which can have time periods that are set shorter than devices associated with a low risk level. As such, the potential risk to the network can be mitigated by reducing the connectivity in proportion to the risk of a network entity. In another example, a risk level can be based on a geographic location or area (e.g., country, state, city, neighborhood) or based on data associated with the NAN such as being in a region of frequent hacker events or including a population that is hostile to a country.

In another example, the condition includes an increased network congestion and the time period is set to a value lower than a standard value. Likewise, the condition can include decreased network congestion and the time period is set to a value lower than a standard value. The variable time period can depend on a state of the network, including a time range of an expected high traffic volume relative to a standard traffic volume, and the time period can be set to a value lower than a standard value.

At 310, the NAN disconnects the wireless device under normal mobility conditions. For example, the NAN can perform a handover procedure that connects the wireless device to another NAN and terminates the connection to the current NAN. In another example, the wireless device terminates a connection with the network.

At 312, the NAN receives a reconnection request of the wireless device to access the network again. That is, after an earlier connection was terminated, the wireless device can seek to reconnect to the network through the same NAN.

At 314, the NAN checks whether the time period has expired because the cached profile data is only available during the time period. The time period can commence when a network session is established and run continuously until expiration (e.g., 3 hours, 2 days). During the time period, the cached profile data is available at the NAN such that the NAN can use the cached profile data in lieu of fetching the entity profile from the upstream network node. Once the time period expires, the cached profile data can be removed, overwritten, or simply marked as unavailable thereby requiring the NAN to fetch the entity profile from the upstream node.

At 316, if the cached profile data is available, the NAN can authenticate the network entity based on the cached profile data stored at the NAN rather than fetching the entity profile from the UDM. The network entity is authenticated with the cached profile data only if the reconnection request is received before the entity profile expires (e.g., the time period expires).

At 318, the NAN grants access by the wireless device to the network based on the cached profile data. In other words, the NAN allows the wireless device to use a service of the network such without needing to burden the UDM to authenticate the network entity.

Deauthorizinq Malicious Small Cells based on a Communications Schedule

Figure 5:
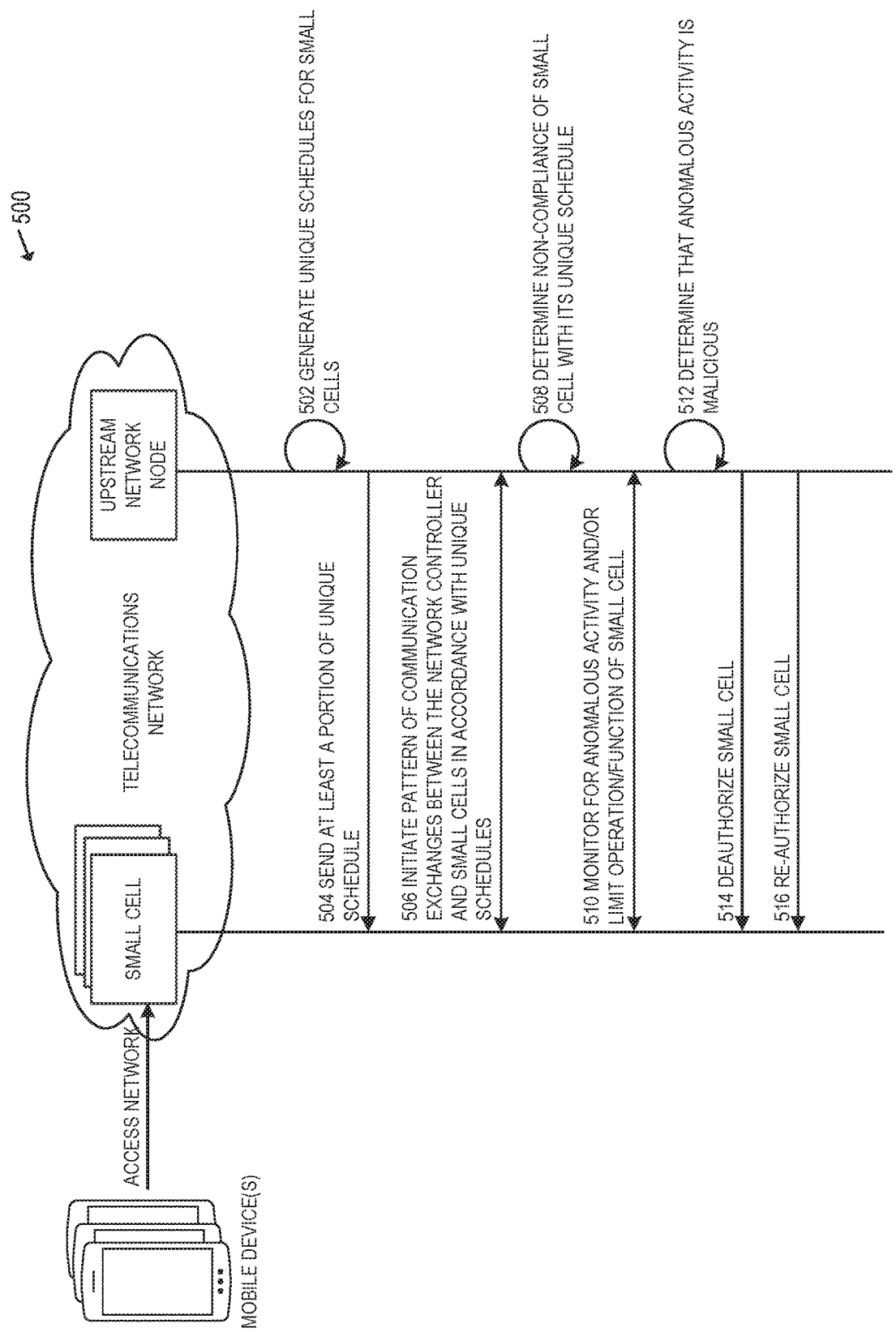
FIG. 5 is a flow diagram that illustrates a method for deauthorizing a malicious small cell of a telecommunications network.

FIG. 5 is a flow diagram that illustrates a method 500 for deauthorizing a malicious NAN such as a malicious small cell (e.g., picocells, femtocells, microcells) of a telecommunications network ("network") such as a 5G network. As shown, one or more mobile devices can access the network through the small cell. The method 500 can be performed by a network node that is upstream of the small cell such as a core node of a 5G network.

At 502, the upstream network node generates a unique schedule for each of multiple small cells. The upstream network node can be a function that resides at a core node or another system of the network. A unique schedule defines a unique pattern of communication exchanges with a small cell by which status signals are sent to the small cell and counterpart response signals are scheduled for the small cell. In particular, the schedule can set a unique pattern of sending status signals to a small cell and set when the small cell should return counterpart response signals.

In one example, the unique pattern of each of the multiple small cells can include a unique periodicity (e.g., per hour, per day) by which status signals are sent to the multiple small cells. The periodic nature of the signaling can be unique for each small cell. For example, the upstream network node can send status signals to a first small cell every 2 hours and send status signals to a second small sell every 18 hours. Alternatively, or additionally, the schedule can set a unique pattern for a small cell to reply to the status signals. For example, a schedule for the first small cell can require a 60-minute delay that decrements by 10 minutes per response to each successive status signal, and a schedule for the second small cell can set a constant 30-second delay per response to each status signal. A small cell's compliance with its unique schedule indicates normal operation.

In another example, the unique pattern can be generated programmatically or algorithmically based on one or more unique data values associated with a NAN. Examples of the unique data values include a MAC address, an IP address, a GPS location, or any other unique identifier of the NAN. In another example, the unique pattern is generated based on a unique combination of unique or non-unique data values associated with the NAN. For example, data values including a regional location, type of NAN, and NAN configuration may not be individually unique, but a combination could be unique such that a unique pattern could be programmatically or algorithmically generated based on the unique combination.

In one implementation, the upstream network node can detect a condition of the network or the small cell and generate the schedule based on that condition. For example, the upstream network node can generate a schedule that requires sparse communication exchanges of small cells in congested areas of the network. In another example, a schedule varies based on a condition of the network, a condition of the small cell, or a time of day. For example, the schedule can be generated dynamically to require fewer responses during periods of known or forecasted network traffic.

At 504, the upstream network node sends at least a portion of the unique schedule to each of the small cells. For example, an entirety of the multiple unique schedules can be stored for the upstream network node but only a portion of each unique schedule is communicated to a respective small cell. The portion communicated to the small cell can include only a delay for responding to the status signals. As such, a small cell's unique schedule may not be entirely visible to the small cell, which prevents a bad actor from circumventing the upstream network node's ability to check for anomalous activity (e.g., a deviation from an expected activity).

At 506, the pattern of communication exchanges between the upstream network node and the multiple small cells are initiated in accordance with their respective unique schedules.

At 508, the upstream network node can determine that a small cell did not comply with its unique schedule. For example, the upstream network node can ascertain a misdetection of a response signal relative to a scheduled point in time as defined in the unique schedule for the small cell. In particular, the upstream network node can fail to receive the first response signal entirely or receive the response signal at an unscheduled time. For example, the response signal can be compared to the scheduled time, and the upstream network node can then determine that the response signal was received at an unscheduled time and that the difference between the received time and the unscheduled time is greater than a threshold.

At 510, in response to the misdetection, the upstream network node begins to monitor the small cell for anomalous activity. The small cell can be monitored for a time period, which can be determined as a function of a condition of the network or the small cell. For example, a monitoring function can be shorter when network traffic is greater compared to when network traffic is lighter.

In another example, the upstream network node can instantiate a firewall to process communications to/from the small cell and upstream network nodes. The firewall can enforce policies to check for anomalous activity that is indicative of malware or other malicious activity. In some implementations, the upstream network node can limit one or more operations or functions of the small cell while being monitored. For example, the firewall can restrict network traffic to/from the small cell to preemptively mitigate any potential harm caused by malicious activity.

In another example, the upstream network node can ascertain a misdetection of another response signal of another small cell relative to a scheduled time indicated by the small cell's unique schedule. In response, one or more operations or functions of the small cell can be restricted. For example, the network traffic of that small cell can be restricted. However, unlike the earlier example, the upstream network node can determine that the anomalous activity associated with the misdetection does not include malicious activity. In response, the one or more operations or functions of the second small cell can be restored.

At 512, the upstream network node can determine that the anomalous activity associated with the misdetection includes malicious activity. For example, the firewall can parse a communication from the small cell and determine that the communication is associated with malware. That is, the malicious activity is detected based on malware identified by the upstream network node. In another example, the malicious activity is detected based on periodic beacon signals that are indicative of machine generated network traffic.

At 514, in response to discovering the malicious activity, the upstream network node can deauthorize the small cell from accessing the network. For example, the upstream network node can wirelessly communicate a deauthorizing signal to the small cell. The deauthorizing signal can temporarily deauthorize the small cell such that one or more of its operations or functions has limited access to the 5G network. For example, a firewall upstream of the small cell can limit the forms of media that are communicated by the small cell over the network. In another example, a particular function or operation of the small cell can be disabled, or the small cell can be disabled entirely.

At 516, the network can later wirelessly communicate an authorizing signal to the small cell to restore its normal operation. For example, the upstream network node can deauthorize the small cell for a predetermined time period such that the authorizing signal is sent after expiration of the time period. In one implementation, the upstream network node sends an authorizing signal to the first small cell after expiration of a time period. The authorizing signal restores the first small cell with one or more limited operations or functions. As such, the upstream network node can continue to monitor the small cell in a restricted state until it is determined that the small cell can safely access the network.

FIG. 5 also illustrates counterpart operations performed by the small cell. For example, the small cell can receive a portion of the schedule that sets a timeframe for responding to received status signals. The small cell then engages in the communication exchange with the upstream network node. When it deviates from the schedule by miscommunicating a response signal (e.g., failed signal or send at an unscheduled time), the small cell receives a wireless signal at its network interface, which causes the small cell to modify an operation of the small cell such as restricting an amount or frequency of communications on the network. In one example, the small cell continues to deviate from the schedule by miscommunicating multiple response signals to the upstream network node and ultimately receives, at the wireless network interface, a deauthorizing signal causing the small cell to disable the operation or function of the small cell or the small cell entirely.

Computer System

Figure 6:
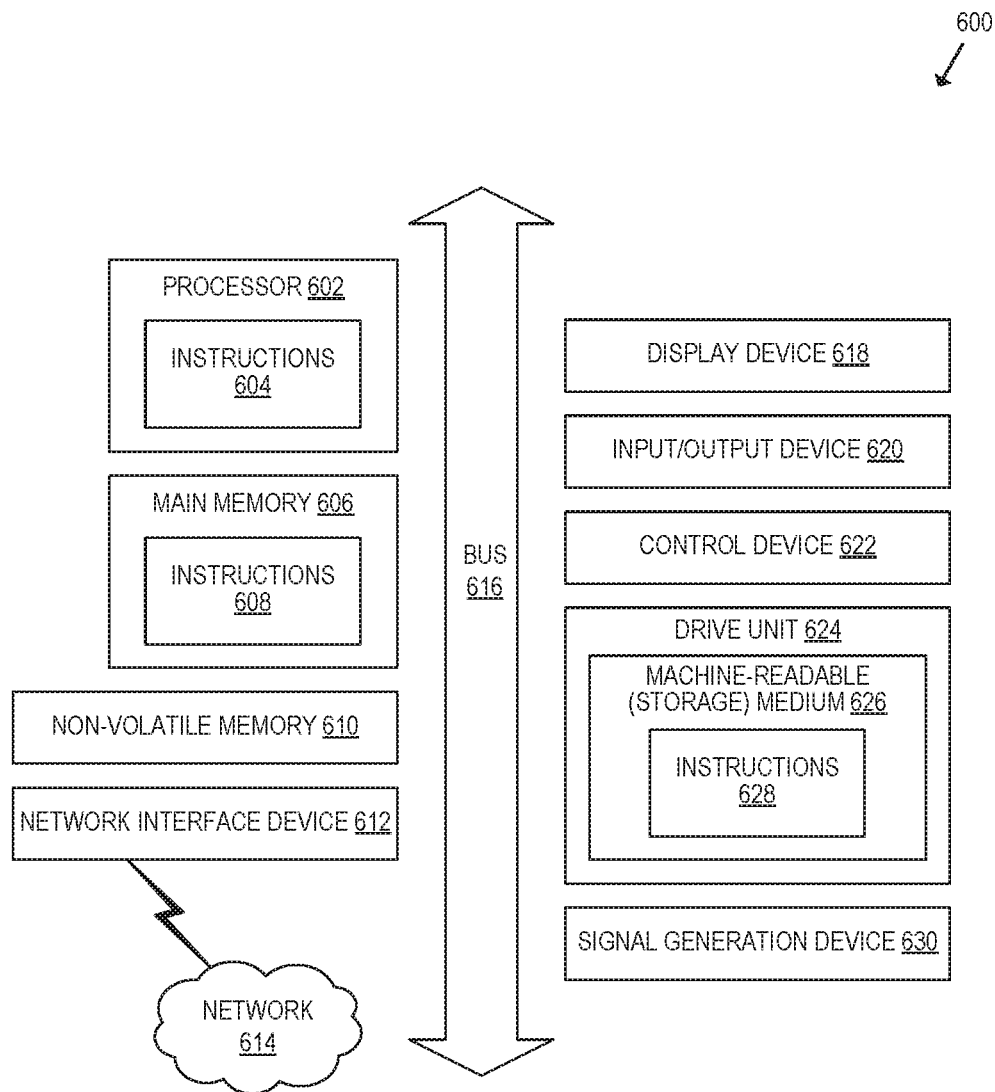
FIG. 6 is a block diagram that illustrates an example of a computing system in which at least some operations described herein can be implemented.

FIG. 6 is a block diagram that illustrates an example of a computer system 600 in which at least some operations described herein can be implemented. For example, components discussed in FIGS. 2-5 can include or host components of the computing system 600.

As shown, the computer system 600 can include one or more processors 602, main memory 606, non-volatile memory 610, a network interface device 612, video display device 618, an input/output device 620, a control device 622 (e.g., keyboard and point device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. The bus 616 therefore can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire"). Various common components (e.g., cache memory) are omitted from FIG. 6 for brevity. Instead, the computer system 600 is intended to illustrate a hardware device on which components illustrated or described relative to the examples of FIGS. 1-5 and any other components described in this specification can be implemented.

The computer system 600 can take any suitable physical form. For example, the computing system 600 may share a similar architecture as that of a personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some embodiment, the computer system 600 can be an embedded computer system, a system-on-chip (SOC), a single-board computer system (SBC) or a distributed system such as a mesh of computer systems or include one or more cloud components in one or more networks. Where appropriate, one or more computer systems 600 can perform operations in real-time, near real-time, or in batch mode.

The processor 602 can be, for example, a central processing unit, a conventional microprocessor (e.g., Intel Pentium processor). The memory (e.g., main memory 606, non-volatile memory 610, machine-readable medium 626) can be local, remote, or distributed. Although shown as single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computing system 600. One skill in the relevant art will recognize that the machine-readable medium 626 can include any type of medium that is accessible by the processor. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 604, 608, 628), which set at various times in various memory and storage devices in computing device(s). When read and executed by the processor 602, the instruction(s) cause the computing system 600 to perform operations to execute elements involving the various aspects of the disclosure.

Although embodiments have been described in the context of fully functioning computing devices, the various embodiments are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

Software is typically stored in the non-volatile memory and/or the drive unit 624. When software is moved to the memory for execution, the processor 602 will typically make use of hardware registers to store values associated with the software and local cache that ideally serves to speed up execution. As used herein, a software program is assumed to be stored at any known or convenient location (e.g., non-volatile storage, hardware registers) when the software program is referred to as "implemented in a computer-readable medium." A processor can be "configured to execute a program" when at least one value associated with the program is stored in a register readable by the processor.

The network interface device 612 enables the computing system 600 to mediate data in a network 614 with an entity that is external to the computing system 600 through any communication protocol supported by the computing system 600 and the external entity. Examiner of the network interface device 612 includes a network adaptor card, a wireless network interface card, a router, an access point, a wireless router, a switch, a multilayer switch, a protocol converter, a gateway, a bridge, bridge router, a hub, a digital media receiver, and/or a repeater.

Further, the interface device 612 can include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, an application, and the circumstances under which the permission rights stand.

Examples of the I/O devices 620 include a keyboard, a mouse or other pointing device, disk drives, printers, a scanner, and other input and/or output devices, including a display device. Examples of the display device 618 can include a cathode ray tube (CRT), liquid crystal display (LCD), or any display device.

In operation, the computer system 600 can be controlled by operating system software that includes a file management system, such as a disk operating system. One example of operating system software with associated item management system software is the family of operating systems known as Windows® from Microsoft Corporation of Redmond, Wash., and their associated item management systems. Another example of operating system software with its associated item management system software is the Linux™ operating system and its associated item management system. The item management system is typically stored in the non-volatile memory and/or drive unit and causes the processor to execute the various acts required by the operating system to input and output data and to store data in the memory, including storing items on the non-volatile memory and/or drive unit.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

Some portions of the detailed description can be presented in terms of algorithms and symbolic representations of operations on data bits within a computer memory. These algorithmic descriptions and representations are the means used by those skilled in the data processing arts to most effectively convey the substance of their work to others skilled in the art. An algorithm can refer to a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems can be used with programs in accordance with the teachings herein, or it can prove convenient to construct more specialized apparatus to perform the methods of some embodiments. The required structure for a variety of these systems will appear from the description below. In addition, the techniques are not described with reference to any particular programming language, and various embodiments can thus be implemented using a variety of programming languages.

In some circumstances, operation of a memory device, such as a change in state from a binary one to a binary zero or vice-versa, for example, can comprise a transformation, such as a physical transformation. With particular types of memory devices, a physical transformation can comprise a physical transformation of an article to a different state or thing. For example, but without limitation, for some types of memory devices, a change in state can involve an accumulation and storage of charge or a release of stored charge.

Likewise, in other memory devices, a change of state can comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device can comprise a transformation, such as a physical transformation. Rather, the foregoing is intended as illustrative examples.

Remarks

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

While specific examples of technology are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples such that alternative implementations can employ differing values or ranges.

Details of the disclosed embodiments may vary considerably in specific implementations while still being encompassed by the disclosed teachings. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain embodiments are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will begin with the words "means for." However, the use of the term "for" in any other context is not intended to invoke a similar interpretation. The applicant reserves the right to pursue such additional claim forms in either this application or in a continuing application.

I claim:

1. A method performed by a wireless wide area network (WWAIAN) transceiver node to re-authenticate a network entity with locally cached profile, the method comprising:
   receiving, from a user equipment (UE), a connection request to access a wireless telecommunications network, wherein the connection request indicates the network entity including the US or a subscriber associated with the UE;
   relaying, to a unified data management (UDM) node, the connection request;
   receiving, from the UDM node, an indication that the network entity is authenticated to access the wireless telecommunications network based on an entity profile stored at the UDM;
   in response to receiving the indication of the authentication:
   fetching entity profile data from the UDM node, establishes a session for the UK to access the wireless telecommunications network, caching the entity profile data at the W\WAAN transceiver node, and caching an indication a time period in association with the cached profile data, wherein the cached profile data expires upon completion of the time period;
   disconnecting the UE from the W\WAAN transceiver node;
   receiving a reconnection request of the UE to access the wireless telecommunications network;
   authenticating the network entity based on the cached profile data stored at the W\WAAN transceiver node rather than requiring the UDM node to authenticate the network entity,
   wherein the network entity is authenticated with the cached profile data only when the reconnection request is received before the cached profile data expires; and
   granting the UE access to the wireless telecommunications network based on the cached profile data.

2. The method of claim 1, wherein the time period is fixed and based on a subscription of the subscriber associated with the UE.

3. The method of claim 1, wherein the time period is variable and depends on a condition of the telecommunications network including a network load or time of day.

4. The method of claim 1, wherein the time period is generated based on a process comprising:
   determining a network load on the telecommunications network such that:

when the network load on the telecommunications network is above a threshold amount, the time period is set to a first amount; and
when the network load is below the threshold amount, the time period is set to a second amount greater than the first amount.

5. The method of claim 1, wherein the WWAN transceiver node is a next generation gigabit NodeB (gNB) and the telecommunications network is a 5G network.

6. The method of claim 1, wherein the WWAN transceiver node is a picocell, a femtocell, or a microcell.

7. The method of claim 1, wherein the time period commences upon establishing the session.

8. The method of claim 1, wherein the network entity is the subscriber, and the entity profile includes a subscriber profile managed by the wireless telecommunications network.

9. The method of claim 1, wherein the network entity is the UE and the entity profile includes a device profile of the UE, wherein the device profile includes one or more capabilities of the device.

10. At least one non-transitory computer-readable storage medium storing instructions to be executed by at least one processor, wherein execution of the instructions cause a small cell of a telecommunications network to:
receive a first connection request of a wireless device to access the telecommunications network;
relay, to an upstream node, the first connection request of the wireless device;
receive, from the upstream node, (i) an indication that the wireless device has been authenticated to access the telecommunications network based on a device profile and (ii) device profile data including information to authenticate the wireless device;
in response to the indication that the wireless device has been authenticated, cache the device profile data at the small cell,
wherein the cached profile data is temporarily enabled to authenticate the wireless device locally at the small cell;
receive a second connection request of the wireless device to access the telecommunications network at the small cell; and
bypass the upstream node to authenticate the wireless device based on the cached profile data,
wherein the wireless device is authenticated with the cached profile data at the small cell only while the cached profile data is enabled.

11. The computer-readable storage medium of claim 10 further causing the small cell to:
disable the cached profile data at the small cell upon ending of a time period associated with the cached profile data;
receive a third connection request of the wireless device to access the telecommunications network at the small cell;
receive, from the upstream node, (i) another indication that the wireless device has been authenticated to access the telecommunications network based on the device profile and (ii) device profile data of the wireless device that enables re-authentication of the wireless device at the small cell.

12. The computer-readable storage medium of claim 10, wherein the time period is generated algorithmically based on data identifying the small cell or the wireless device, and wherein the time period commences when the wireless device is authenticated with the device profile.

13. The computer-readable storage medium of claim 10, wherein the time period varies depending on a network traffic load, the small cell being further caused to:
set the time period for a first value when the network traffic load is greater than a threshold amount, and
set the time period for a second value when the network traffic load is less than a threshold amount, the second value being greater than the first value.

14. The computer-readable storage medium of claim 10, wherein the time period is determined at the small cell and depends on a pattern of connectivity of the wireless device with the small cell.

15. A network access node (NAN) comprising:
a network interface;
a wireless transceiver system for exchanging wireless communications signals using wireless wide area networking (WWAN) or wireless local area networking (WLAN) protocols;
a processor; and
a memory coupled to the processor, wherein the memory stores instructions which, when executed by the processor, cause the NAN to:
receive, at the network interface, a first connection request from a wireless device to access a telecommunications network,
wherein the first connection request includes an indication of a subscriber;
relay, to a unified data management (UDM) node, the first connection request of the wireless device;
obtain, from the UDM, subscriber profile data from the UDM node based on the indication of the subscriber;
cache the subscriber profile data at the NAN;
set a time period associated with the cached profile data,
wherein the time period is set based on a detected condition or state of the telecommunications network or the NAN;
receive a reconnection request from the wireless device to access the telecommunications network;
authenticate the subscriber based on the cached profile data at the NAN rather than require the UDM node to authenticate the subscriber,
wherein the subscriber is authenticated with the cached profile data only when the reconnection request is received before the cached profile data expires; and
granting, to the wireless device, access to the telecommunications network based on the cached profile data.

16. The network access node of claim 15, wherein the condition includes an increased network congestion and the time period is set to a value lower than a standard value.

17. The network access node of claim 15, wherein the condition includes a decreased network congestion and the time period is set to a value lower than a standard value.

18. The network access node of claim 15, wherein the state of the network includes a time range of an expected high traffic volume relative to a standard traffic volume, and the time period is set to a value lower than a standard value.

19. The network access node of claim 15, wherein the network interface is a millimeter wave (mmW) interface and the connection request is for an mmW connection of the telecommunications network.

20. The network access node of claim 15, wherein the state of the NAN includes an association with one of a high risk level, a medium risk level, and a low risk level to the telecommunications network posed by the NAN.

* * * * *